United States Patent [19]
Watts

[11] 3,847,017
[45] Nov. 12, 1974

[54] STRAIN MEASURING SYSTEM
[75] Inventor: Jack Watts, Whitley Bay, England
[73] Assignee: Welwyn Electric Limited, Bedlington, England
[22] Filed: Feb. 21, 1973
[21] Appl. No.: 334,253

[30] Foreign Application Priority Data
Mar. 20, 1972 Great Britain.................... 12824/72
Mar. 24, 1972 Great Britain................... 14070/72

[52] U.S. Cl............................................. 73/88.5 R
[51] Int. Cl. ............................................. G01b 7/16
[58] Field of Search...... 73/88.5 R, 141 A; 324/130, 324/62, 63, 65 R

[56] References Cited
UNITED STATES PATENTS
| | | | |
|---|---|---|---|
| 3,046,782 | 7/1962 | Laimins | 73/88.5 X |
| 3,102,981 | 9/1963 | Pulliam | 324/130 X |
| 3,161,821 | 12/1964 | Price et al. | 73/88.5 R |
| 3,541,320 | 11/1970 | Beall | 324/130 |
| 3,667,041 | 5/1972 | Senour | 73/88.5 R X |
| 3,714,806 | 2/1973 | Berkey et al. | 73/88.5 R X |

Primary Examiner—James J. Gill
Assistant Examiner—Stephen A. Kreitman

[57] ABSTRACT

A measuring device comprising the following:
a. a Wheatstone bridge containing at least one resistance strain gauge adapted to measure stress or strain;
b. means for providing a direct current voltage supply to the bridge;
c. means for sensing a voltage applied to the bridge and for providing a reference voltage for a signal resulting from unbalance in the bridge due to the effect of strain on the gauge, the signal being an amplified output voltage from the bridge;
d. means for correcting for the gauge factor of the strain gauge by varying the gain to the output voltage from the bridge; and
e. means for indicating the ratio between the signal and the reference voltage.

9 Claims, 3 Drawing Figures

STRAIN MEASURING SYSTEM

BACKGROUND OF THE INVENTION

The present invention relates to the measurement and indication of strain and especially to a measuring device incorporating at least one electrical resistance strain gauge.

Electrical resistance strain guages are known and a number of different kinds are available. For example, there are gauges comprising thin metal foils or wires arranged in a selected pattern on a flexible substrate. When such a gauge is bonded to the surface of a mechanical structure and stress is applied to the structure, this is transmitted to the strain gauge, causing its dimensions and hence its electrical resistance to change.

Also known are semiconductor strain gauges which are piezoresistive, i.e., their electrical resistance changes as a result of a force applied thereto.

Strain gauges possess what is known as a Gauge Factor (i.e., G.F.). This is a term which relates the increase in resistance (i.e., $\Delta R$) per unit resistance (i.e., R) and the increase in the gauge length (i.e., $\Delta l$) per unit length (i.e., 1):

$$G.F. = \frac{\frac{\Delta R}{R}}{\frac{\Delta l}{l}}$$

Reference will be made below to the accompanying drawings in which

Figure 1:
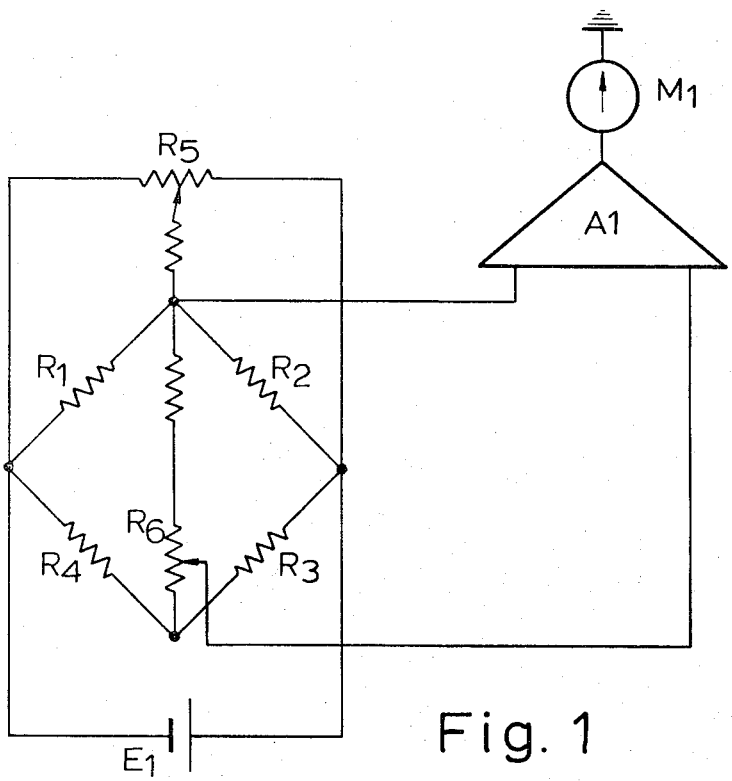
FIG. 1 represents a circuit diagram of a known measuring system using one or more strain gauges and which provides an indication of the strain in a structure under test.

In FIG. 1, $R_1$, $R_2$, $R_3$ and $R_4$ represent electrical resistors, at least one of which is a strain gauge, connected in the form of a Wheatstone bridge. Provision is normally made for operating the bridge in quarter, half, or full form; to complete the bridge circuit as required, one or more fixed or variable electrical resistors or so-called dummy strain gauges are included in addition to the one or more strain gauges which are used for measuring strain. $E_1$ represents a direct current voltage supply for the bridge. The output from the bridge is fed through an amplifier $A_1$ to a meter $M_1$ which indicates when the bridge is balanced. The bridge may be balanced by means of a calibrated variable resistance control $R_5$, the position of this control providing an indication of the strain in the specimen under test.

There are certain disadvantages associated with a measuring system of this kind. The bridge balance control $R_5$ is located in the bridge circuit and as a consequence, the sensitivity of the bridge tends to be reduced. Furthermore, this control employs moving contacts and their presence in such a sensitive part of the system can result in uncertainties in the contact resistance involved and undesirable electrical noise. The range of the balance control $R_5$ also tends to vary according to the resistance value of the strain gauge element or elements in use and since the relationship between the angular rotation of this control and the balance of the bridge is non-linear, calibration curves may be necessary for satisfactory operation of the system.

Systems are also known in which the balance indicating meter $M_1$ is replaced by an indicator calibrated in units of microstrain. In this case, the bridge is balanced initially and any unbalance resulting from strain induced in a gauge element connected in the bridge network is displayed on the calibrated indicator. It is necessary to compensate for the gauge factor of the gauge being used and this is achieved by means of a variable resistor $R_6$ which is suitably calibrated. In addition to the undesirable electrical noise resulting from the moving contacts in resistor $R_6$ and a reduction of the sensitivity of the bridge due to the presence of $R_6$ in the bridge circuit, any variations in the supply voltage to the bridge and indicator are reflected in the indicated strain value, leading to undesirable errors.

It is a purpose of the present invention to minimize or overcome one or more of the above disadvantages.

The present invention is based on the provision of a reference voltage for the bridge circuit which makes the reading on the indicator independent of the supply voltage for the bridge. As will be seen from the specific description below, it is possible to eliminate from the bridge circuit itself resistors fulfilling the function of $R_5$ and/or $R_6$ in a known measuring system such as is described by reference to FIG. 1 of the drawings.

SUMMARY OF THE INVENTION

The present invention provides a measuring device comprising the following:

a. a Wheatstone bridge containing at least one resistance strain gauge adapted to measure stress or strain;

b. means for providing a direct current voltage supply to the bridge;

c. means for sensing a voltage applied to the bridge and for providing a reference voltage for a signal resulting from unbalance in the bridge due to the effect of strain on the gauge or gauges, the signal being an amplified output voltage from the bridge (this means is preferably one or more amplifiers);

d. means for correcting for the gauge factor of the strain gauge or gauges by varying the gain to the output voltage from the bridge (this means is preferably a variable gain control on an amplifier which amplifies the output voltage from the bridge); and e. means for indicating the ratio between the signal and the reference voltage (this ratio is preferably displayed on an indicator calibrated in units of strain and said indicating means is preferably a digital indicator).

In addition to the features (a) to (e) above the device of the present invention may also include means for compensating at least partly for bridge unbalance by summing the signal (i.e., the amplified output voltage from the bridge) and a voltage derived from the reference voltage means (summation is preferably achieved by means of a summing amplifier and the voltage derived from the reference voltage means is preferably obtained by way of a potentiometer).

The unbalance in the bridge for which it may be desirable to compensate may be initial unbalance due to mismatch of the individual resistors (e.g. strain gauges) in the arms of the bridge; in addition, when the bridge is unbalanced due to the effect of a particular level of strain in the strain gauge or gauges, it may be required to compensate for this unbalance and then measure further changes of strain from this point. This facility is useful in the case where a large stress is initially applied to a specimen, resulting in a large strain output from the strain gauge or gauges attached thereto, and where it is then required to monitor subsequent small changes in strain. In this case, the bridge unbalance due to the initial high level of strain could be compensated for and an indication of the further small changes in strain then obtained.

DESCRIPTION OF THE PREFERRED EMBODIMENT

One embodiment of the invention is now described with reference to FIG. 2 of the drawings. A Wheatstone bridge network is provided in which $R_7$ connected to terminals 1 and 2 represents an "active" resistance strain gauge which in practice would be mounted on a mechanical structure under test. $R_8$ and $R_9$ are fixed resistors of equal value, e.g. $500\Omega$, which form a dummy half-bridge when it is not required to operate the bridge as a full bridge of active resistance strain gauge elements. A switch 9 is inserted between the junction 3 of resistors $R_8$ and $R_9$ and a terminal 5. For quarter or half-bridge operation this switch is closed. The output from the bridge is taken from terminals 1 and 5. For full bridge operation, an "active" resistance strain gauge (not shown) may be connected between terminals 2 and 5 and an active resistance strain gauge (not shown) may be connected between terminals 4 and 5. Switch 9 would then be opened to disconnect the dummy half-bridge formed by $R_8$ and $R_9$. The bridge is completed either by connecting a further "active" resistance strain gauge (not shown) between terminals 1 and 4 or, for quarter-bridge operation, one or the other of fixed resistors $R_{10}$ and $R_{11}$ is connected into the network, according to the resistance value of strain gauge $R_7$, by linking terminal 6 with either terminal 7 or terminal 8. $R_{10}$ and $R_{11}$ would normally have resistance values of 120 ohm and 350 ohm respectively to match the value of strain gauge $R_7$. These values for $R_{10}$ and $R_{11}$ are chosen because foil and wire strain gauges are usually manufactured with a resistance value of 120 ohm or 350 ohm. A D.C. voltage is supplied to terminals 2 and 4 of the bridge from a conventional transformer/rectifier system $E_2$, whose output is stabilized by means of zener diodes.

A reference amplifier $A'_2$, also connected to terminals 2 and 4, provides the external reference voltage for a digital indicator, $M_2$, e.g. a digital panel meter, the "balance" voltage for a variable balance control $R_{13}$, by means of which compensation for unbalance in the bridge may be effected, and also controls the common mode voltage at the bridge output terminals. This amplifier maintains the common mode voltage at terminals 1 and 5 at about zero volts and also provides a low impedance point on the bridge to ground as otherwise the bridge voltage would be floating The gain of the reference amplifier $A'_2$ is chosen to give the correct reference voltage for the digital meter $M_2$. It is to be noted that this amplifier $A'_2$ provides the reference voltage which constitutes the basis of the present invention.

Amplifiers $A_3$, $A_4$ and $A_5$ amplify the output voltage from the bridge and this amplification network also contains a potentiometer $R_{12}$ which enables the gain to be varied and corrects for the gauge factor of the strain gauges connected in the bridge circuit (e.g. $R_7$). The gain of the amplification network is chosen so that the digital indicator $M_2$ reads directly in units of microstrain. $R_{12}$ would normally be calibrated in units of gauge factor. Strain gauge manufacturers usually supply details of the value of the gauge factor of a particular strain gauge and after connecting the gauge or gauges in the bridge circuit, the value of the gauge factor would be set on control $R_{12}$. An amplifier $A_6$ sums the amplified output voltage from the bridge and a voltage derived from the reference amplifier $A'_2$ via potentiometer $R_{13}$ which compensates in whole or in part for unbalance in the bridge. The output from amplifier $A_6$ is connected to the digital display $M_2$.

The calibration of the digital indicator may be checked by arranging for the bridge to be unbalanced by a predetermined amount which corresponds to a particular level of strain. With the bridge in balance, switch 10 is pressed to connect a resistor $R_{14}$ across that arm of the bridge between terminals 2 and 5. If the value of strain indicated on the indicator $M_2$ is different from that which $R_{14}$ is chosen to provide, the calibration of $M_2$ is adjusted until the correct reading is obtained. Switch 10 is then released.

The method of operation is as follows. For simplicity only one "active" strain gauge $R_7$ is shown connected to the bridge, connection being between terminals 1 and 2. Switch 9 is closed and terminal 6 is connected to either terminal 7 or terminal 8 according to the resistance value of strain gauge $R_7$, as previously explained. $R_{12}$ is set to a position appropriate to the gauge factor of $R_7$. $R_{13}$ is adjusted until the digital indicator $M_2$ indicates zero strain. Switch 10 is then depressed to connect resistor $R_{14}$ across arm $R_8$ of the bridge, thereby causing indicator $M_2$ to indicate a particular value of strain predetermined by $R_{14}$. If the correct indication is not obtained, the calibration of indicator $M_2$ is reset accordingly and switch 10 is released. When strain is induced in $R_7$ as a result of a mechanical stress applied thereto by means of a mechanical structure to which $R_7$ is attached, the level of strain is indicated directly on the digital indicator $M_2$.

If desired, $M_2$ may be set to zero, i.e., unbalance of the bridge may be compensated for, when a particular level of strain is induced in $R_7$. This is achieved by further adjustment of $R_{13}$. Having established this new zero reference point, any further strain induced in $R_7$ is indicated directly on $M_2$.

The device of the invention specifically described above has the following advantages:

The reading on the indicator is independent of the bridge voltage and if a full bridge of active strain gauge elements is employed the loss of bridge voltage due to line drop on long leads from the indicating instrument to the bridge can be eliminated by connecting the inputs of the reference amplifier (which provides the reference voltage) directly to the bridge.

The gauge factor and bridge balance controls do not form part of the bridge circuit and hence the possibility of changes in bridge sensitivity due to these controls is eliminated. Both controls are also operating at a higher level of signal than in prior art systems.

The above measuring system is especially useful in combination with a device or a method for the correction of an undesirable voltage introduced by apparatus used for processing faint signals, whereby inaccurate readings may be improved.

It is often necessary to process an electrical D.C. voltage signal of small magnitude so that it is put in a form in which it can be readily and accurately evaluated. Of special significance is the measurement of the output voltage from a Wheatstone or similar bridge network of electrical resistance elements. Such bridge networks, especially Wheatstone bridge networks, are utilized in electrical measuring instruments and a particularly important application is in the measurement of mechanical strain in which case the bridge network has connected therein one or more electrical resistance strain gauge elements which are mounted on a mechanical structure under test. Such strain gauge elements and their connection in a Wheatstone bridge network are well known in the art, but in brief, the application of a stress to the mechanical structure on which a strain gauge is mounted causes strain to be induced in the gauge and its resistance will change. If the bridge network in which the gauge is connected is initially in balance, so that there is no output voltage from it, then a change in resistance of the strain gauge causes the bridge to become unbalanced and a voltage of small magnitude appears at its output terminals, the output being proportional to the strain induced in the gauge. The small D.C. output from the bridge, or indeed any D.C. voltage of similar magnitude which it is desired to evaluate is commonly applied to a signal processing device incorporating one or more directly coupled amplifiers, such amplifiers being well known in the art, and the output from the processor monitored and sometimes indicated on a meter. The use of one or more directly coupled amplifiers for this purpose introduces a source of error; this arises because such an amplifier has an output voltage when the input is zero and this output voltage tends to drift with time and with fluctuations in temperature. Hereinafter this output voltage from an amplifier forming part of a signal processing device, when the input voltage is zero, is referred to as "drift voltage."

The above undesirable characteristic of directly coupled amplifiers makes it extremely difficult to obtain an accurate or reliable measurement and indication of a parameter (for example, mechanical strain), since the drift voltage is not insignificant compared with the signal being processed.

The apparatus and method of correcting wholly or partly drift voltage, as herein defined, resulting from a signal processing device including one or more directly coupled amplifiers described below minimize or obviate the above undesirable characteristic of directly coupled amplifiers.

Said apparatus for correcting drift voltage, as herein defined, resulting from a directly coupled amplifier forming part of a D.C. signal processing device comprises means for sampling said drift voltage, means for developing a voltage to correct said drift voltage, means for storing developed voltage, and means for feeding stored voltage to the signal processing device at a time when it is desired to correct said drift voltage.

Said method for correcting drift voltage, as herein defined, comprises sampling the drift voltage, developing a voltage to correct sampled voltage, storing developed voltage, and feeding stored voltage to the signal processing device (herein referred to also as "processor") when it is desired to correct the drift voltage.

The correction voltage is preferably stored in a hold circuit and inverted and applied by an amplifier in the hold circuit to a final amplifier of the signal processor.

Figure 2:
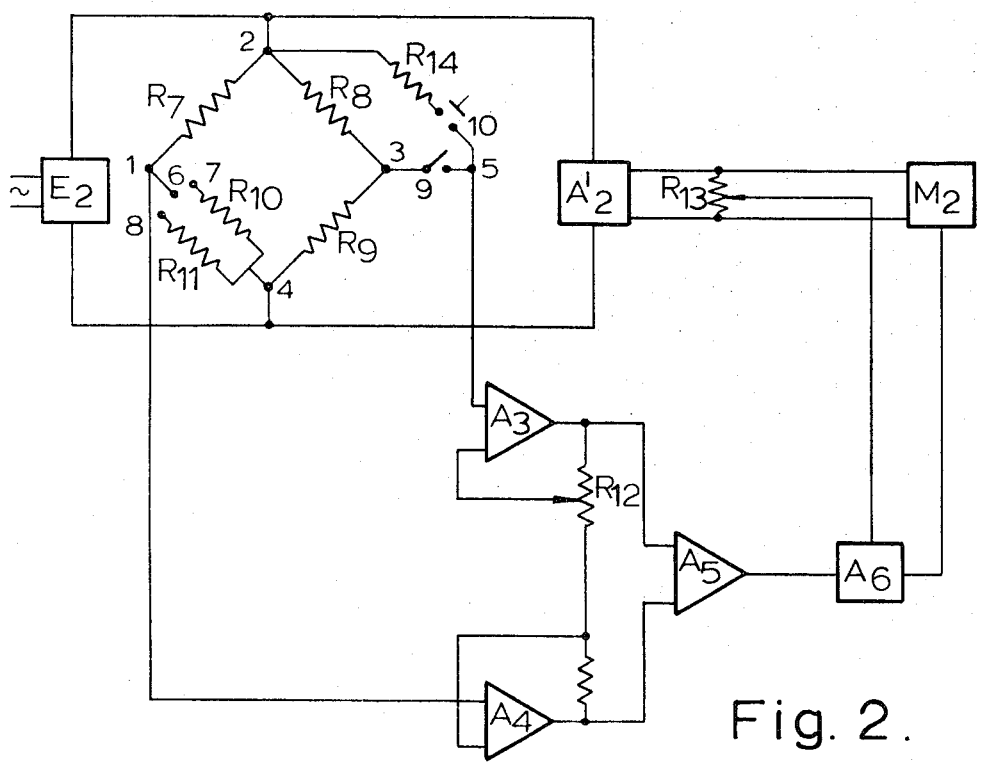
FIG. 2 represents a circuit diagram of a measuring device of the present invention.
Figure 3:
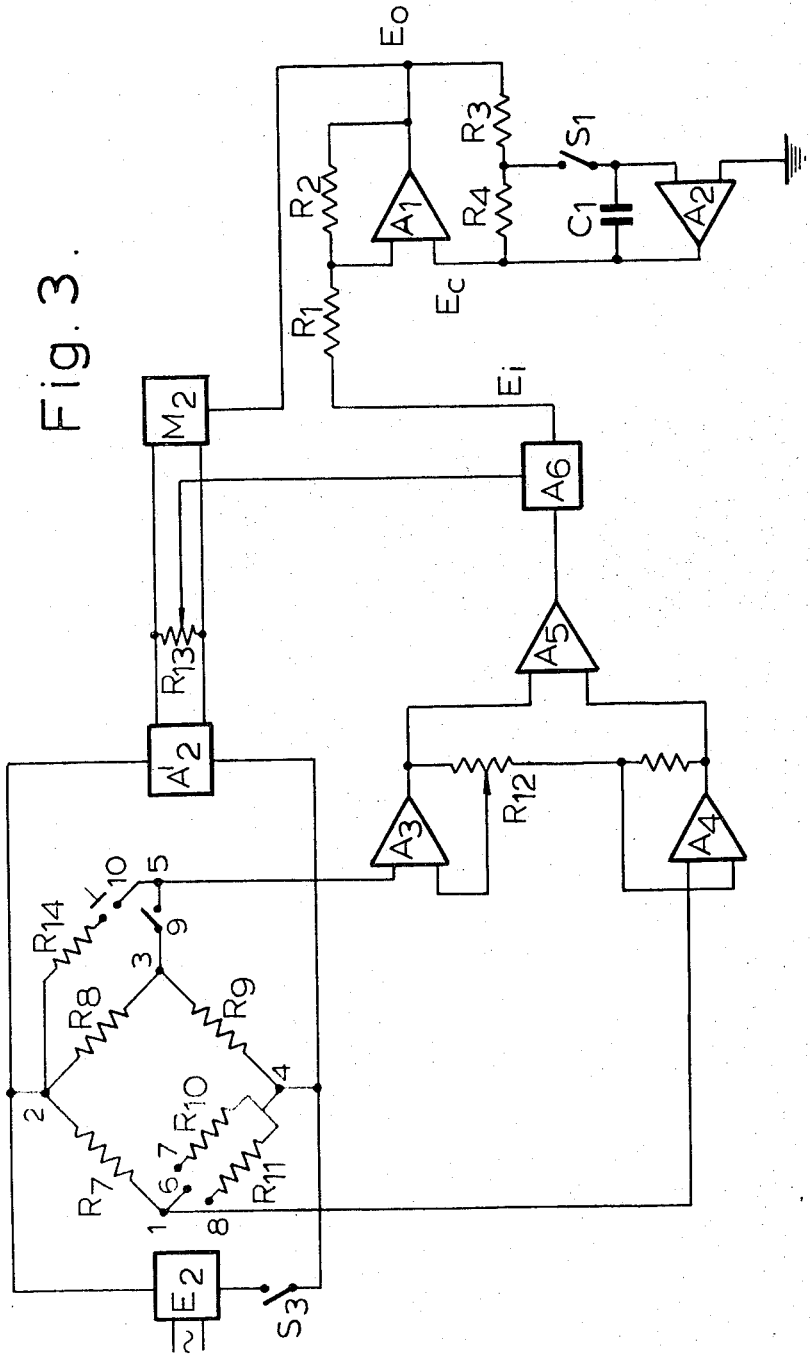
FIG. 3 represents a circuit diagram of one embodiment of a drift voltage correction device for use with the device illustrated by FIG. 2.

In FIG. 3 of the drawings there is described one embodiment of a device for the correction of processed electrical signal voltages of small magnitude used in combination with the measuring system shown in FIG. 2 of the drawings. A final amplification stage $A_1$, $R_1$, $R_2$ has been provided as an addition to the amplifiers of the processing apparatus shown in FIG. 2. When no input signal is applied to the processor, for example when switch $S_3$ is opened, the drift voltage of the system is $E_i$; this results from all the stages of the processor up to, but not including, the final amplification stage: total drift voltage $E_o$ (this takes into account $E_i$ and the drift voltage due to the last amplifier $A_1$) appearing at the output from the processor is sampled by a circuit comprising resistors $R_3$ and $R_4$, capacitor $C_1$ and amplifier $A_2$, switch $S_1$ being closed during this operation. In this way the capacitor $C_1$ becomes charged so that a voltage results given by $E_o \cdot (R_4/R_3)$; the polarity of this voltage is at once inverted by an inverting amplifier $A_2$, giving rise to the required correction voltage $E_c$ which is stored by the capacitor $C_1$. The correction voltage $E_c$ is fed to the amplifier $A_1$. When the gain of the amplifier $A_2$ is made large compared with the gain of the amplifier $A_1$ (i.e., when $[R_4/R_3]$ is large compared with $[R_2/R_1]$, the drift voltage $E_i$, after passing through the amplifier $A_1$, is reduced in the ratio $[R_3/R_4]$. Thus, in theory, if $R_4$ is made infinitely large, i.e., removed from the circuit, then the drift voltage can be reduced substantially to zero. In practice, however, in order to achieve adequate stability in the system, it is better for $R_4$ to have a finite resistance value: for example, if the ratio of $R_4$ to $R_3$ is 500, then the resulting drift voltage at the output of $A_1$ would be approximately 1/500 of what it would have been in the absence of any correction. When switch $S_1$ is opened and switch $S_3$ is closed, the input signal due to unbalance of the bridge resulting from strain induced in $R_7$ is processed by the processor and the output $E_o$ is then the sum of the output voltage resulting from the processed signal and any very small drift voltage remaining after correction by the voltage $E_c$.

$S_1$ and $S_3$ are periodically closed and opened respectively and the drift voltage sampled and a correction voltage stored in capacitor $C_1$ ready to be applied when $S_1$ is opened while $S_3$ is closed and a signal passes through the processor. Switches $S_1$ and $S_3$ will be ganged so that they operate simultaneously but so that $S_1$ is open while $S_3$ is closed and vice versa.

The opening and closing of switches $S_1$ and $S_3$ at a predetermined frequency means that the supply voltage to the bridge is in pulse form. A suitable width for each pulse is 40 milliseconds, the repetition frequency for each pulse being suitably up to 2 per second. It is known that with some types of pulse operated bridges there can be the problem of reactive balance, but in this case, the bridge balancing and read-out will be effected after the voltage pulse has reached its steady peak value and such a problem does not exist. The rise time of the pulse is also unimportant when operating in this condition.

For a fixed pulse length, the effective power applied to the bridge varies according to the pulse repetition frequency. This facility to vary mean power, rather than voltage, is very useful because with constant pulse amplitude, the power is independent of the sensitivity of the system and only affects discrimination or time resolution if the strain is changing.

The contents of copending Application No. of even date ("IMPROVEMENTS IN OR RELATING TO VOLTAGE MEASUREMENT DEVICES"), claiming priority of United Kingdom Patent Application No. 14070/72 filed on Mar. 24, 1972, are incorporated herein by reference.

Although the present invention is described herein with particular reference to specific details, it is not intended that such details shall be regarded as limitations upon the scope of the invention except insofar as included in the accompanying claims.

I claim:

1. A measuring device comprising:
   a. a Wheatstone bridge containing at least one resistance strain gauge adapted to produce an output voltage corresponding to unbalance in the bridge due to the effect of strain on the gauge;
   b. means for providing a DC voltage to the bridge;
   c. means for sensing the DC voltage applied to the bridge and producing a reference voltage therefrom;
   d. means for amplifying said output voltage;
   e. means for calibrating the device for different strain gauges by varying the gain in said amplifying means;
   f. means for indicating the ratio between the output voltage and the reference voltage; and
   g. means for compensating for bridge unbalance by summing the output voltage and a balance voltage derived from said reference voltage.

2. A measuring device according to claim 1 in which the means for sensing includes at least one amplifier and the means for calibrating is a variable gain control on the means for amplifying the output voltage.

3. A measuring device according to claim 1 in which said ratio is displayed on an indicator calibrated in units of strain and said indicating means is a digital indicator.

4. A measuring device according to claim 1 wherein the DC voltage is pulsed between zero and a positive value and further including means for correcting for a drift voltage produced in said measuring device during periods when the DC voltage is zero, including:
   a. means for sampling said drift voltage when said DC voltage is zero,
   b. means for developing a voltage to correct for said drift voltage,
   c. means for storing the developed voltage,
   d. means for applying the developed voltage to the measuring device to correct for said drift voltage prior to said indicating means forming said ratio.

5. A measuring device according to claim 1 wherein the DC voltage is pulsed between zero and a positive value and further includes means for correcting for a drift voltage produced in said measuring device during periods when the DC voltage is zero, including:
   a. means for sampling said drift voltage when said DC voltage is zero,
   b. means for developing a voltage to correct for said drift voltage,
   c. means for storing the developed voltage,
   d. means for applying the developed voltage to the measuring device to correct for said drift voltage prior to said indicating means forming said ratio.

6. A measuring device according to claim 4 in which the means for storing is a hold circuit including inverting means and the means for applying the developed voltage applies said voltage to a final stage of said amplifier means.

7. A measuring device comprising:
   a. a Wheatstone bridge containing at least one resistance strain gauge adapted to produce an output voltage corresponding to unbalance in the bridge due to the effect of strain on the gauge,
   b. means for providing a DC voltage to the bridge,
   c. first amplifier means for sensing the DC voltage applied to the bridge and producing a reference voltage therefrom,
   d. second amplifier means for amplifying said output voltage,
   e. a gain control for calibrating the device for different strain gauges by varying the gain in said second amplifying means, and
   f. a digital indicator calibrated in units of strain for displaying the ratio between the output voltage and the reference voltage; and
   g. summing amplifier means for compensating for bridge unbalance by summing the output voltage and a balance voltage derived from the reference voltage.

8. A measuring device according to claim 7 wherein the DC voltage is pulsed between zero and a positive value and further including means for correcting for a drift voltage produced in said measuring device during periods when the DC voltage is zero, including:
   a. means for sampling said drift voltage when said DC voltage is zero,
   b. means for developing a voltage to correct for said drift voltage,
   c. means for storing the developed voltage,
   d. means for applying the developed voltage to the measuring device to correct for said drift voltage prior to said indicating means forming said ratio.

9. A measuring device according to claim 8, in which the means for storing is a hold circuit including inverting means and the means for applying the inverted developed voltage applies said voltage to a final stage of said second amplifier means.

* * * * *